Patented Jan. 25, 1927.

1,615,550

UNITED STATES PATENT OFFICE.

JOSEPH B. OESCH, OF MILWAUKEE, WISCONSIN, ASSIGNOR TO THE NEWPORT COMPANY, OF CARROLLVILLE, WISCONSIN, A CORPORATION OF DELAWARE.

TRISAZO DYESTUFF AND THE PROCESS OF MANUFACTURE.

No Drawing.   Application filed February 6, 1926. Serial No. 86,655.

This invention relates to trisazo dyes capable of dyeing unmordanted cotton orange to brown shades of great fastness to light. The new dyes are derived from acetylamino Cleves acid, two molecular proportions of m-toluidine as middle components, and one molecular proportion of an end component consisting of phenylmethylpyrazolone or its substitution products.

These new dyes correspond to the general formula:

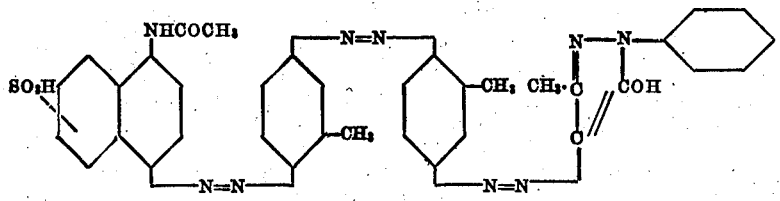

The process of manufacture consists in combining the diazotized acetylamino Cleves acid (1-acetylamino 4 naphthylamine 6 sulfonic acid, or 1 acetylamino 4 naphthylamine 7 sulfonic acid, or a mixture of both) with m-toluidine, diazotizing the intermediate dye thus obtained, combining it with m-toluidine, diazotizing the resulting disazo dyestuff, and combining the latter with phenylmethylpyrazolone or a substitution product thereof.

Without limiting my invention to any particular procedure, the following example in which parts by weight are given illustrates the application of my invention in the preferred form:

28 parts of acetylamino Cleves acid (1 acetylamino 4 naphthylamine 6 sulfonic acid, or 1 acetylamino 4 naphthylamine 7 sulfonic acid, or a mixture of both) dissolved in 300 parts of water, is cooled to 0° C. and acidulated with 35 parts of hydrochloric acid, sp. gr. 1.163, and diazotized with 6.9 parts of sodium nitrite. The diazo compound is then added to a solution of 11.3 parts of m-toluidine and 11.6 parts of hydrochloric acid in 100 parts of water. The mixture is stirred for a short time and a solution of 25 parts of sodium acetate is slowly added and stirred until the copulation is complete. The resulting amino azo dyestuff is acidulated with 35 parts of hydrochloric acid, sp. gr. 1.163, and diazotized with 6.9 parts of sodium nitrite. The mixture is stirred until the nitrous acid has disappeared. The diazo compound thus obtained is added to a solution made up of 11.3 parts of m-toluidine and 11.6 parts of hydrochloric acid in 100 parts of water. This is then stirred for a quarter of an hour and 25 parts of sodium acetate are slowly added. The mixture is again stirred until the copulation is complete. The amino disazo dyestuff is then acidulated with 35 parts of hydrochloric acid and further diazotized with 7 parts of nitrite and the mixture stirred until diazotization is complete. The diazo compound is then added to a solution of 27.9 parts of phenylmethylpyrazolone sulfonic acid sodium salt, 160 parts of water, and 95.4 parts of soda ash. Agitation is continued for six hours, the solution is heated and salted, filtered and the filter cake dried. The new dye corresponds to the following formula:

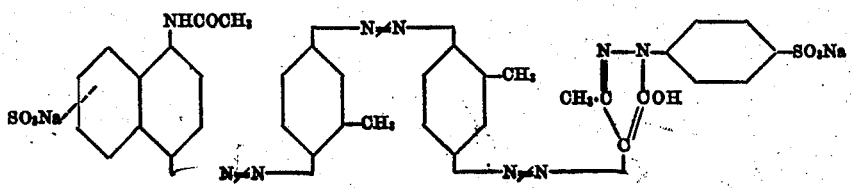

After being dried and pulverized, in the state of its sodium salt, the dye is a dark powder easily soluble in water with an orange brown coloration. It dyes cotton in orange brown shades, very fast to light.

The sodium salts of this class of dyes are in general soluble in water to orange brown solutions, the color of the solutions changing with caustic soda to reddish brown. With hydrochloric acid the dyes are partly separated as brown precipitates. The dye powders are insoluble in ether and benzene and partly soluble in alcohol to give orange brown solutions.

Strong reducing agents split up the trisazo structure, as indicated, to give in the case of the specific dye of the above example the following reduction products:

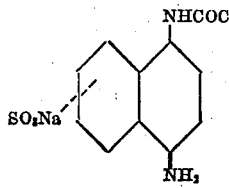
1-acetylamino-4-amino-naphthalene-6-sulfonic-acid (sodium salt)

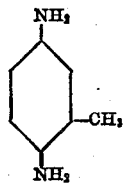
2 molecules methyl-p-phenylene-diamine

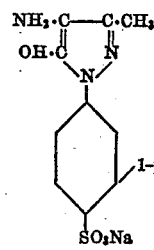
1-p-sulfophenyl-3-methyl-4-amino-5-pyrazolone

I am aware that numerous details of the process may be varied through a wide range without departing from the spirit of this invention, and I do not desire limiting the patent granted other than as necessitated by the prior art.

I claim as my invention:

1. As a new article of manufacture a trisazo dye as herein described, having most probably the following formula:

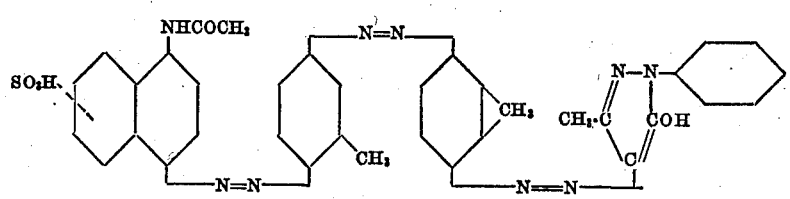

this dye being in the shape of its sodium salt a dark powder soluble in water to an orange-brown solution, the color of the solution changing with caustic soda to a reddish brown; with hydrochloric acid the dye is separated out as a brown flocculent precipitate; said powder being insoluble in organic solvents such as ether, partly soluble in benzene and alcohol, being destroyed by strong reducing agents and the dyeings on cotton being orange to brown.

2. As a new article of manufacture a trisazo dye as herein described having most probably the following formula:

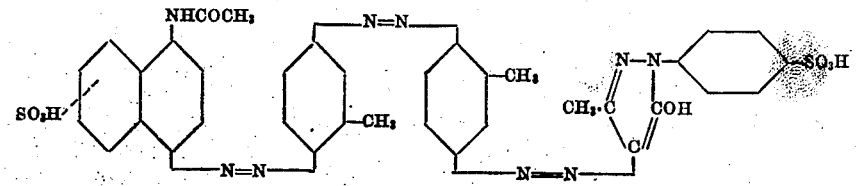

3. The method of preparing a trisazo dye of the general formula:

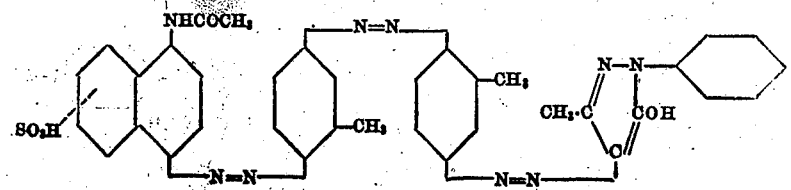

which consists in combining acetylamino Cleves acid with m-toluidine, diazotizing the intermediate compound thus obtained, combining it with m-toluidine, diazotizing the disazo compound, and combining the last mentioned compound with phenylmethylpyrazolone.

4. Materials dyed with the dye, described in claim 1.

5. Materials dyed with the dye, described in claim 2.

In testimony whereof I have hereunto subscribed my name.

JOSEPH B. OESCH.